Jan. 23, 1923.

P. WIRUM.
ANIMAL TRAP.
ORIGINAL FILED OCT. 11, 1919.

1,443,244.

P. Wirum. Inventor

By Geo. P. Kimmel.

Attorney

Patented Jan. 23, 1923.

1,443,244

UNITED STATES PATENT OFFICE.

PETER WIRUM, OF OPHIR, TERRITORY OF ALASKA.

ANIMAL TRAP.

Application filed October 11, 1919, Serial No. 330,082. Renewed August 11, 1922. Serial No. 581,259.

*To all whom it may concern:*

Be it known that I, PETER WIRUM, a citizen of the United States, residing at Ophir, Alaska, have invented certain new and useful Improvements in an Animal Trap, of which the following is a specification.

This invention has for its object to provide an improved animal trap embodying such novel features of construction as tend to simplify and render the same more compact and convenient to manipulate and set.

Another object is the provision of an improved type of trap jaw of light rigid structure which is so designed as to prevent mutilation of the trapped animal.

With these and other objects in view as will appear as the description proceeds the invention comprises the novel features of construction, combination of elements and arrangement of parts which will be more fully described in the following specification and set forth with particularity in the claim appended hereto.

Figure 1:
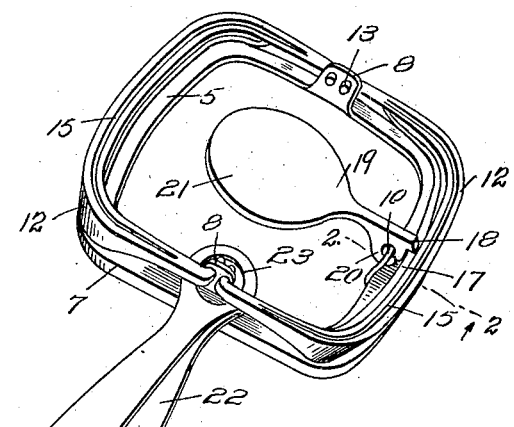
Figure 1 represents a perspective view of the improved trap.

Referring to the drawing in detail, wherein similar reference numerals designate corresponding parts throughout the several views, the numeral 5 indicates a substantially rectangular body or frame which is preferably stamped from sheet metal of such thickness as to lend requisite strength and rigidity thereto and which is provided with a depending reinforcing flange 7 along its outer edge. The inner edges of the frame are formed at opposite points with upstanding lugs or ears 8 having spaced apertures 9 therein and a trigger supporting ear 10 having an intermediate aperture 11 is formed on the inner edge of one of the intermediate side members of the frame and constitutes a support for the pivoted trigger to be hereinafter more fully described.

A pair of pivoted jaws designated generally by the numerals 12 is pivotally supported in the ears 8 and as the structure of the two jaws is identical, a detail description of one will suffice for both. Each jaw is substantially U-shaped in form and is provided terminally with inwardly directed extensions 13 which are pivotally mounted in the apertures of the ears 8. The web portion of the jaw is increased in width and the engaging face 14 of the jaw is of broad flat area so as to prevent mutilation of the trapped animal and is formed with a relatively narrow shallow groove 15 for increasing the gripping qualities thereof and preventing the animal from extricating itself when trapped. The longitudinal rib 16 formed on the portions of the jaw opposite the engaging face 14 strengthens and increases the rigidity thereof without materially increasing its weight.

Figure 2:
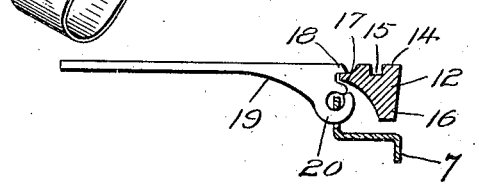
Figure 2 represents an enlarged fragmentary sectional view through one side of the frame or body member of the trap illustrating the trigger in detail, and, Figure 3 represents a perspective view of the frame detached.
Figure 3:
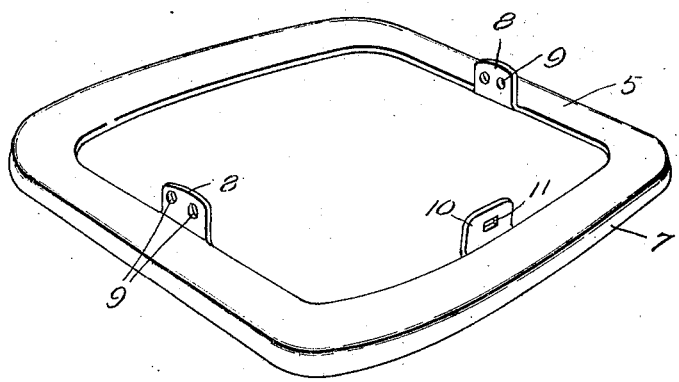

The web portion of each jaw is substantially triangular in cross section, as suggested in Fig. 2, and is provided with an inwardly directed shoulder or rib 17 preferably provided with a curved working face engageable by the locking finger 18 of the trigger plate 19 to increase the sensitiveness of the trigger release. The trigger 19 is provided with a slit loop 20 pivotally mounted in the apertured ear 10 and so arranged as to maintain the jaws of the trap in open position. The trigger 19 extends inwardly toward the center of the frame 5 and is provided with an enlarged flat inner terminal 21 constituting a tread plate engageable by the foot of the animal to automatically release the trap jaws.

A substantially U-shaped jaw actuating spring 22 projects laterally of the frame 5 and is provided with enlarged apertured terminals 23 receiving one of the jaw supporting ears 8. The terminals of the spring are confined between the plate 5 and the adjacent pivoted terminals of the jaws 12 and the tension thereof normally tends to spring the jaws upwardly and together so as to firmly grip the leg or other portion of an animal disposed between the jaws.

What I claim is:

A trap including a frame structure, a pair of jaws pivotally secured thereto, each jaw including a substantially U-shaped member having the web portion increased in width and being substantially triangular in cross section, said web portion being provided with a flat engaging face having a longitudinal groove therein, relatively narrow reinforcing ribs projecting laterally and below each jaw, the laterally projecting rib having a curved face constituting a stop shoulder, a pivoted trigger engageable with the curved face of the rib to maintain the jaws in open position, and spring means normally tending to close the jaws.

In testimony whereof, I affix my signature hereto.

PETER WIRUM.